United States Patent
Wang et al.

(10) Patent No.: US 11,474,232 B2
(45) Date of Patent: Oct. 18, 2022

(54) RANGE DOPPLER ANGLE DETECTION METHOD AND RANGE DOPPLER ANGLE DETECTION DEVICE

(71) Applicant: KaiKuTek Inc., Taipei (TW)

(72) Inventors: Mike Chun-Hung Wang, Taipei (TW); Chun-Hsuan Kuo, San Diego, CA (US); Chih-Wei Chen, Tainan (TW); Wen-Sheng Cheng, Taipei (TW); Guan-Sian Wu, Taichung (TW); Chieh Wu, Hsinchu (TW); Wen-Jyi Hwang, Taipei (TW); Yu-Feng Wu, Zhubei (TW); Khoi Duc Le, New Taipei (TW)

(73) Assignee: Kaikutek Inc., Taipei (TW)

( * ) Notice: Subject to any disclaimer, the term of this patent is extended or adjusted under 35 U.S.C. 154(b) by 99 days.

(21) Appl. No.: 17/207,315

(22) Filed: Mar. 19, 2021

(65) Prior Publication Data
US 2022/0299625 A1    Sep. 22, 2022

(51) Int. Cl.
G01S 13/72    (2006.01)
G06F 17/14    (2006.01)
G01S 13/50    (2006.01)
G06F 3/01    (2006.01)

(52) U.S. Cl.
CPC ............ *G01S 13/723* (2013.01); *G01S 13/50* (2013.01); *G06F 17/142* (2013.01); *G06F 3/017* (2013.01)

(58) Field of Classification Search
CPC ...... G01S 13/723; G01S 13/50; G06F 17/142; G06F 3/017
USPC .......................................................... 342/70
See application file for complete search history.

(56) References Cited

U.S. PATENT DOCUMENTS

| 2014/0181168 A1* | 6/2014 | Baksheev ............. G06F 17/142 |
| | | 708/404 |
| 2022/0057485 A1* | 2/2022 | Chi ....................... G01S 7/4056 |
| 2022/0229152 A1* | 7/2022 | Lamontagne ........... G01S 13/86 |

FOREIGN PATENT DOCUMENTS

| CN | 107024685 A | 8/2017 |
| CN | 108828548 A | 11/2018 |
| CN | 111427031 A | 7/2020 |
| CN | 111476058 A | 7/2020 |
| CN | 111695420 A | 9/2020 |
| TW | 202009650 A | 3/2020 |

(Continued)

OTHER PUBLICATIONS

TIPO, Office Action of the related TW application No. 110115805 dated Jan. 3, 2022, 3 pages.

*Primary Examiner* — Allen C Wong
(74) *Attorney, Agent, or Firm* — Bradley J. Thorson; DeWitt LLP

(57) ABSTRACT

A range Doppler angle detection method executed by a range Doppler angle detection device includes steps of: receiving a first sensing signal and a second sensing signal; performing 1D Fast Fourier Transform (FFT) and 2D FFT to the first sensing signal for calculating one first 2D FFT map; performing the 1D FFT and the 2D FFT to the second sensing signal for calculating one second 2D FFT map; picking up one column of the first 2D FFT map and one column of the second 2D FFT map according to a given Doppler index; performing the 3D FFT to the picked column of the first 2D FFT map and the picked column of the second 2D FFT map for calculating a range Doppler angle. Therefore, a computation loading of the gesture recognition function can be reduced.

13 Claims, 4 Drawing Sheets

(56) References Cited

FOREIGN PATENT DOCUMENTS

WO 2021/068470 A1 4/2021

\* cited by examiner

RANGE DOPPLER ANGLE DETECTION METHOD AND RANGE DOPPLER ANGLE DETECTION DEVICE

BACKGROUND OF THE INVENTION

1. Field of the Invention

The present invention relates to an angle detection method and an angle detection device, and more particularly to a range Doppler angle detection method and a range Doppler angle detection device.

2. Description of the Related Art

One of the conventional gesture recognition systems is a Doppler radar gesture recognition system. The Doppler radar gesture recognition system senses motions, shapes, or gestures exercised by a user and generates a corresponding Range Doppler Image (RDI). The Doppler radar gesture recognition system usually performs a 1D Fast Fourier Transform (FFT) to detect a range of an object, performs a 2D FFT to detect a velocity of the object, and performs a 3D FFT to detect an angle of the object.

The Doppler radar gesture recognition system may be deployed in a smart device such as a smart phone, a tablet or the like, and the Doppler radar gesture recognition system may use the processor of the smart device to recognize gesture sensing signals and to classify gesture events. The smart device may execute functions according to the recognized gestures events. For example, the smart device may have to match the recognized user gesture events with preset ones to enable the user to unlock the smart device.

However, a calculation of the 3D FFT is complex, and the gesture recognition function is just part of the functions of the smart device. When the gesture recognition function incurs high computation loading, the normal operations of the smart device will be adversely affected.

Accordingly, the efficiency of the Doppler radar recognition system needs to be further improved.

SUMMARY OF THE INVENTION

An objective of the present invention is to provide a range Doppler angle detection method and a range Doppler angle detection device. The present invention may reduce computation loading of a gesture recognition function.

The range Doppler angle detection method includes steps of:

receiving a first sensing signal and a second sensing signal;

performing 1D Fast Fourier Transform (FFT) to the first sensing signal for calculating a plurality of first 1D FFT maps;

performing 2D FFT to the first 1D FFT maps for calculating at least one first 2D FFT map;

performing the 1D Fast Fourier Transform (FFT) to the second sensing signal for calculating a plurality of second 1D FFT maps;

performing the 2D FFT to the second 1D FFT maps for calculating at least one second 2D FFT map;

picking up one column of the at least one first 2D FFT map and one column of the at least one second 2D FFT map according to a given Doppler index;

performing the 3D FFT to the picked column of the at least one first 2D FFT map and the picked column of the at least one second 2D FFT map for calculating a range Doppler angle.

Further, the range Doppler angle detection device includes a transmitting unit, a first sensing unit, a second sensing unit, and a processing unit. The transmitting unit transmits a detecting signal. The first sensing unit senses a first sensing signal, and the second sensing unit senses a second sensing signal. The processing unit is electrically connected to the transmitting unit, the first sensing unit, and the second sensing unit.

The processing unit receives the first sensing signal from the first sensing unit and the second sensing signal from the second sensing unit, performs 1D FFT to the first sensing signal for calculating a plurality of first 1D FFT maps, and performs 2D FFT to the first 1D FFT maps for calculating at least one first 2D FFT map.

Moreover, the processing unit performs the 1D Fast Fourier Transform (FFT) to the second sensing signal for calculating a plurality of second 1D FFT maps, and performs the 2D FFT to the second 1D FFT maps for calculating at least one second 2D FFT map.

The processing unit further picks up one column of the at least one first 2D FFT map and one column of the at least one second 2D FFT map according to a given Doppler index, and performs the 3D FFT to the picked column of the at least one first 2D FFT map and the picked column of the at least one second 2D FFT map for calculating a range Doppler angle.

Since the present invention performs the 3D FFT just to the picked column of the at least one first 2D FFT map and the picked column of the at least one second 2D FFT map, the present invention may not perform the 3D FFT to all values in the first 2D FFT map and the second 2D FFT map. Therefore, the computation loading of the gesture recognition function can be reduced.

DETAILED DESCRIPTION OF THE INVENTION

Figure 1:
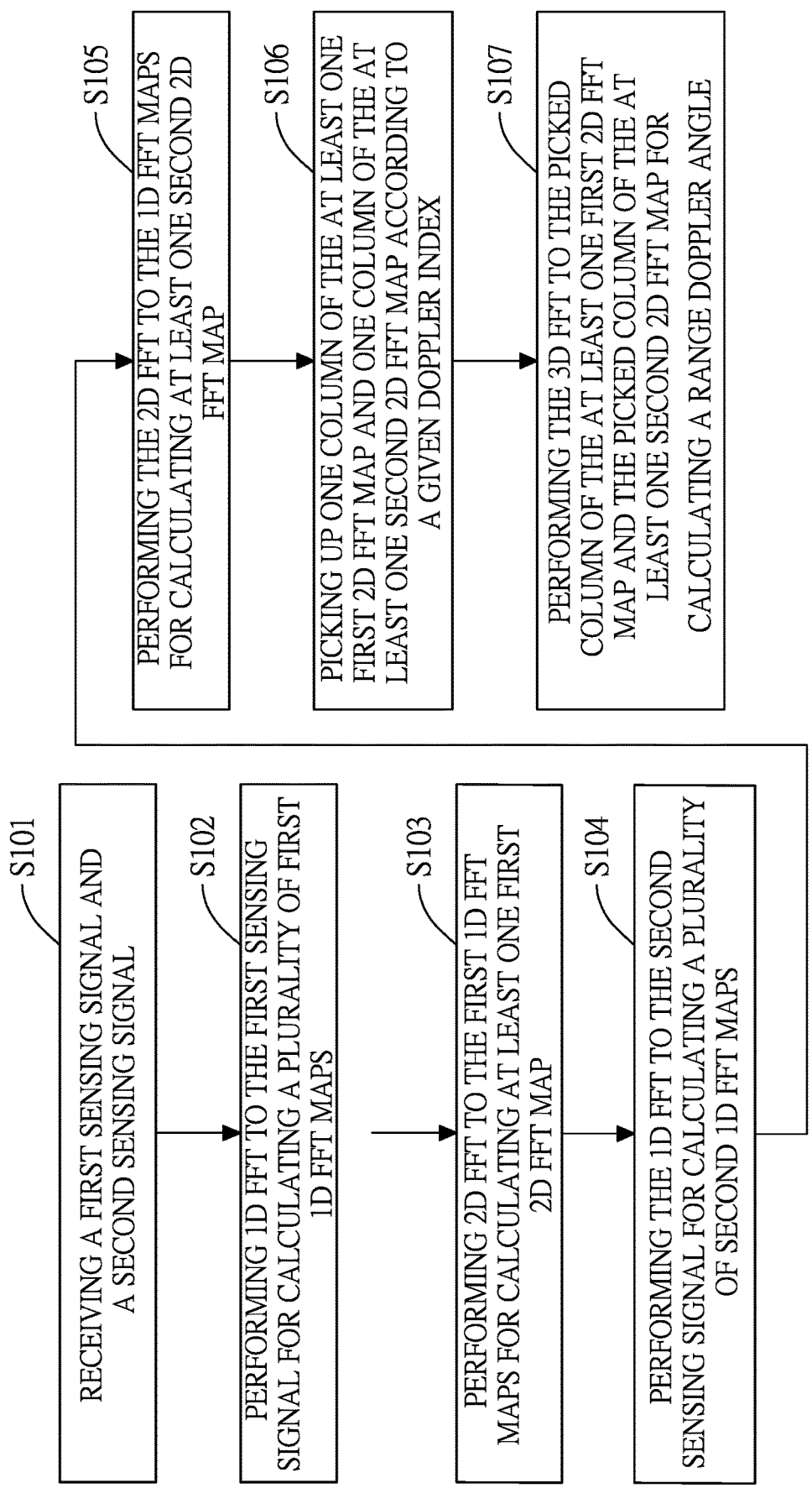
FIG. 1 is a flowchart of a range Doppler angle detection method of the present invention.
Figure 2:
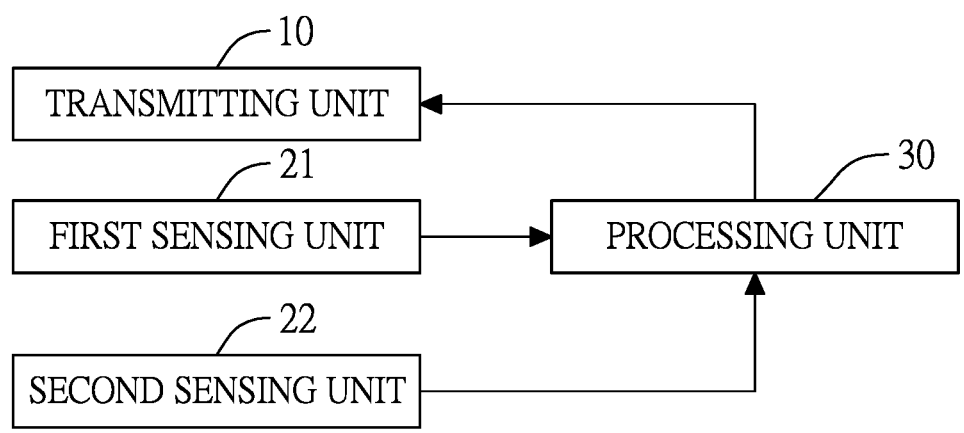
FIG. 2 is a block diagram of a range Doppler angle detection device of the present invention.

With reference to FIGS. 1 and 2, the present invention relates to a range Doppler angle detection method and a range Doppler angle detection device.

The range Doppler angle detection method includes steps of:

receiving a first sensing signal and a second sensing signal (S101);

performing 1D FFT to the first sensing signal for calculating a plurality of first 1D FFT maps (S102);

performing 2D FFT to the first 1D FFT maps for calculating at least one first 2D FFT map (S103);

performing the 1D FFT to the second sensing signal for calculating a plurality of second 1D FFT maps (S104);

performing the 2D FFT to the 1D FFT maps for calculating at least one second 2D FFT map (S105);

picking up one column of the at least one first 2D FFT map and one column of the at least one second 2D FFT map according to a given Doppler index (S106);

performing the 3D FFT to the picked column of the at least one first 2D FFT map and the picked column of the at least one second 2D FFT map for calculating a range Doppler angle (S107).

Further, the range Doppler angle detection device includes a transmitting unit 10, a first sensing unit 21, a second sensing unit 22, and a processing unit 30. The transmitting unit 10 transmits a detecting signal. The first sensing unit 21 senses a first sensing signal, and the second sensing unit 22 senses a second sensing signal.

The processing unit 30 receives the first sensing signal from the first sensing unit 21 and the second sensing signal from the second sensing unit 22, performs 1D FFT to the first sensing signal for calculating a plurality of first 1D FFT maps, and performs 2D FFT to the first 1D FFT maps for calculating at least one first 2D FFT map. Moreover, the processing unit 30 performs the 1D FFT to the second sensing signal for calculating a plurality of second 1D FFT maps, and performs the 2D FFT to the second 1D FFT maps for calculating at least one second 2D FFT map.

The processing unit 30 further picks up one column of the at least one first 2D FFT map and one column of the at least one second 2D FFT map according to a given Doppler index, and performs the 3D FFT to the picked column of the at least one first 2D FFT map and the picked column of the at least one second 2D FFT map for calculating a range Doppler angle. Since the present invention performs the 3D FFT just to the picked column of the at least one first 2D FFT map and the picked column of the at least one second 2D FFT map, the present invention may not perform the 3D FFT to all values in the first 2D FFT map and the second 2D FFT map. Therefore, the computation loading of the gesture recognition function can be reduced.

Figure 3:
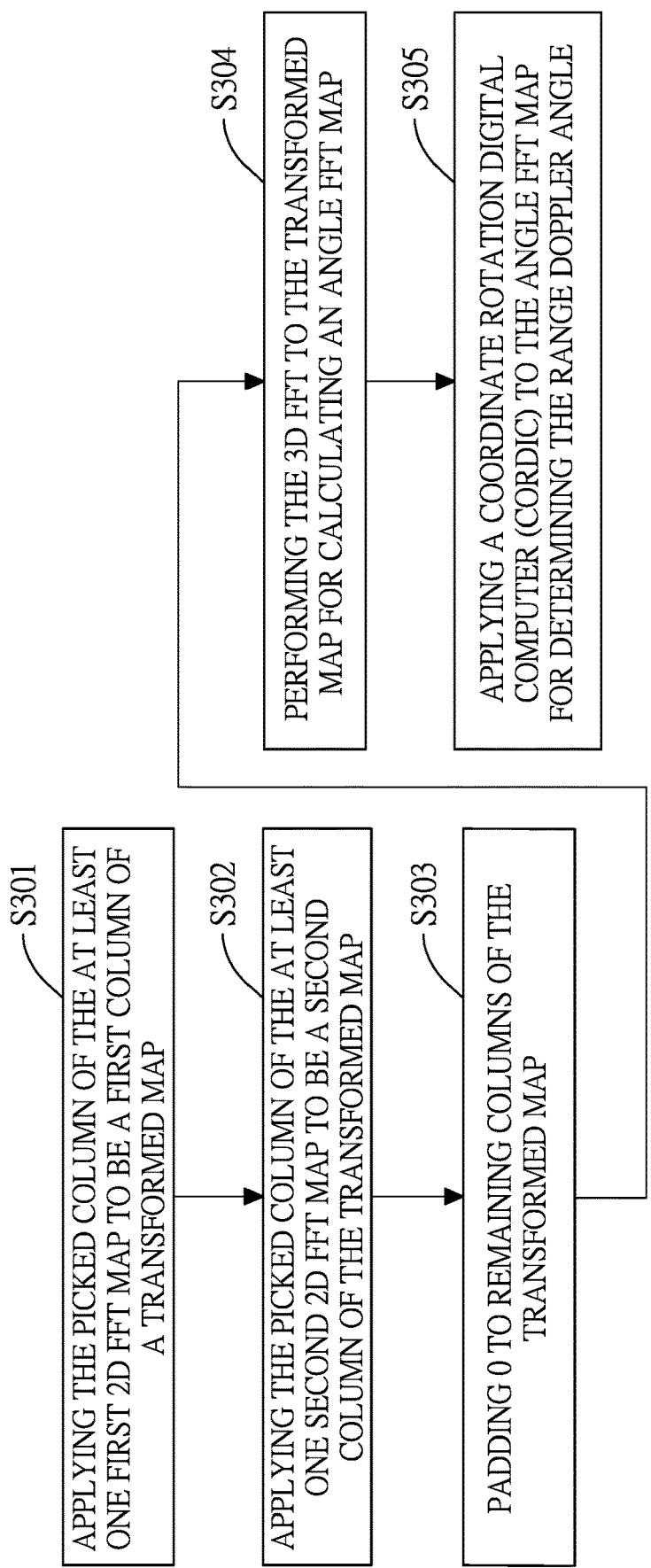
FIG. 3 is another flowchart of the range Doppler angle detection method of the present invention.

With reference to FIG. 3, in step S107, the range Doppler angle detection method further includes steps of:

applying the picked column of the at least one first 2D FFT map to be a first column of a transformed map (S301);

applying the picked column of the at least one second 2D FFT map to be a second column of the transformed map (S302);

padding 0 to remaining columns of the transformed map (S303);

performing the 3D FFT to the transformed map for calculating an angle FFT map (S304);

applying a coordinate rotation digital computer (CORDIC) to the angle FFT map for determining the range Doppler angle (S305).

Figure 4:
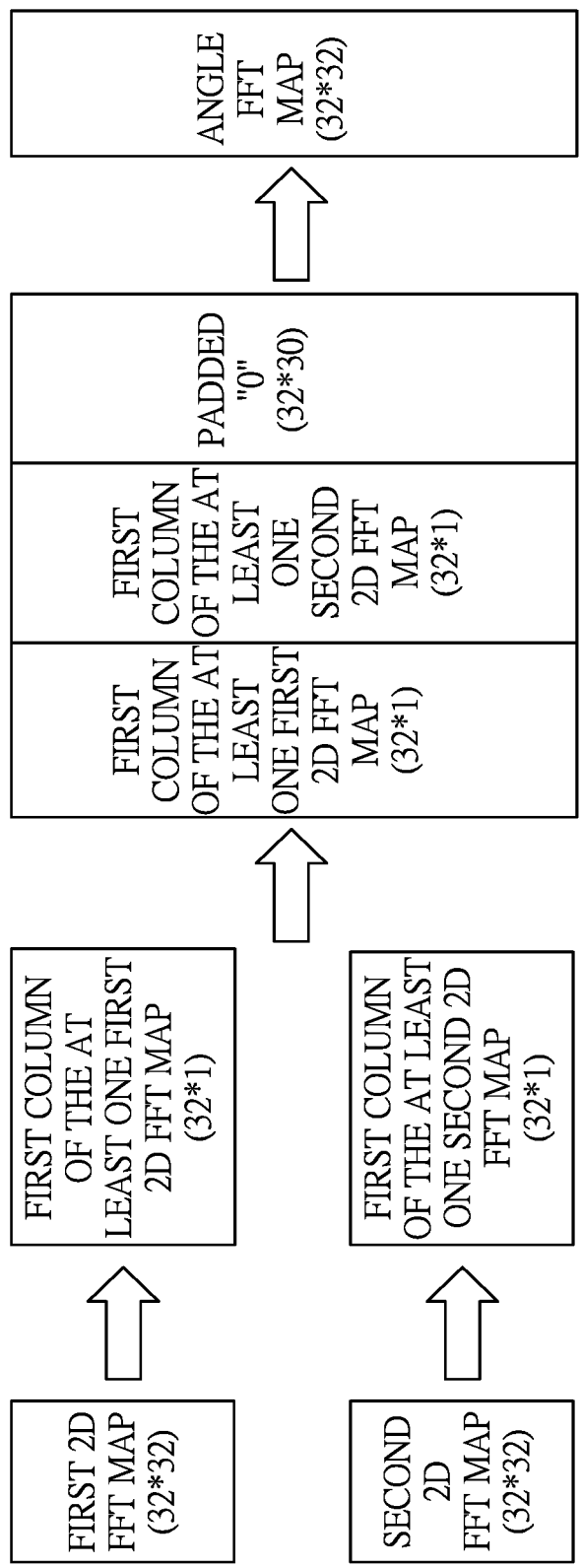
FIG. 4 is a schematic diagram of performing the 3D FFT to a picked column of at least one first 2D FFT map and a picked column of at least one second 2D FFT map of the present invention.

With reference to FIG. 4, for example the at least one first 2D FFT map and the at least one second 2D FFT map are each a 32*32 map. Namely, the at least one first 2D FFT map and the at least one second 2D FFT map each include 32*32 values arranged in 32 columns and 32 rows.

When the Doppler index is 0, the first column of the at least one first 2D FFT map and the first column of the at least one second 2D FFT map are picked. Then, the picked column, such as the first column, of the at least one first 2D FFT map is applied to be the first column of the transformed map, and the picked column, such as the first column, of the at least one second 2D FFT map is applied to be the second column of the transformed map. Further, since the transformed map is also a 32*32 map, the remaining columns, such as the 3rd to the 32nd columns, of the transformed map are padded "0". Namely, 32*30 zeros arranged in 30 columns and 32 rows are padded into the 3rd to the 32nd columns of the transformed map.

Further, the rows of the transformed map are each processed by the 3D FFT to calculate the angle FFT map, and the CORDIC is applied to the angle FFT map for the range Doppler angle.

In an embodiment of the present invention, the range Doppler angle detection method is executed by the processing unit 30 of the range Doppler angle detection device. Further, the given Doppler index is 0, the picked column of the at least one first 2D FFT map is a first column of the at least one first 2D FFT map, and the picked column of the at least one second 2D FFT map is a first column of the at least one second 2D FFT map. Moreover, the first sensing signal and the second sensing signal are received from different receiving chains. The first sensing signal and the second sensing signal are frequency modulated continuous waveform (FMCW) signals.

In the embodiment, the transmitting unit 10 is an FMCW transmitter. The first receiving unit and the second receiving unit are FMCW receivers. Namely, the first sensing unit is a first receiving chain, and the second sensing unit is a second receiving chain different from the first receiving chain. Further, the processing unit 30 is a central processing unit (CPU) of a smart phone.

Since the processing unit 30 merely performs the 3D FFT to a transformed map, and the transformed map merely includes the picked columns of the at least one first 2D FFT map and the at least one second 2D FFT map and the padded "0" columns, calculations of the 3D FFT to the transformed map may be simple. Therefore, the computation loading of the gesture recognition function can be reduced, and normal operations of the smart device will not be adversely affected.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A range Doppler angle detection method, comprising steps of:

receiving a first sensing signal and a second sensing signal;

performing 1D Fast Fourier Transform (FFT) to the first sensing signal for calculating a plurality of first 1D FFT maps;

performing 2D FFT to the first 1D FFT maps for calculating at least one first 2D FFT map;

performing the 1D FFT to the second sensing signal for calculating a plurality of second 1D FFT maps;

performing the 2D FFT to the second 1D FFT maps for calculating at least one second 2D FFT map;

picking up one column of the at least one first 2D FFT map and one column of the at least one second 2D FFT map according to a given Doppler index;

performing 3D FFT to the picked column of the at least one first 2D FFT map and the picked column of the at least one second 2D FFT map for calculating a range Doppler angle.

2. The range Doppler angle detection method as claimed in claim 1, wherein the step of performing the 3D FFT to the picked column of the at least one first 2D FFT map and the picked column of the at least one second 2D FFT map for calculating a range Doppler angle further comprises substeps of:

applying the picked column of the at least one first 2D FFT map to be a first column of a transformed map;

applying the picked column of the at least one second 2D FFT map to be a second column of the transformed map;

padding 0 to remaining columns of the transformed map;

performing the 3D FFT to the transformed map for calculating an angle FFT map;

applying a coordinate rotation digital computer (CORDIC) to the angle FFT map for determining the range Doppler angle.

3. The range Doppler angle detection method as claimed in claim 1, wherein the given Doppler index is 0.

4. The range Doppler angle detection method as claimed in claim 1, wherein the picked column of the at least one first 2D FFT map is a first column of the at least one first 2D FFT map, and the picked column of the at least one second 2D FFT map is a first column of the at least one second 2D FFT map.

5. The range Doppler angle detection method as claimed in claim 1, wherein the first sensing signal and the second sensing signal are received from different receiving chains.

6. The range Doppler angle detection method as claimed in claim 1, wherein the first sensing signal and the second sensing signal are frequency modulated continuous waveform (FMCW) signals.

7. A range Doppler angle detection device, comprising:
a transmitting unit, transmitting a detecting signal;
a first sensing unit, sensing a first sensing signal;
a second sensing unit, sensing a second sensing signal; and
a processing unit, electrically connected to the transmitting unit, the first sensing unit, and the second sensing unit;
wherein the processing unit receives the first sensing signal from the first sensing unit and the second sensing signal from the second sensing unit, performs 1D Fast Fourier Transform (FFT) to the first sensing signal for calculating a plurality of first 1D FFT maps, and performs 2D FFT to the first 1D FFT maps for calculating at least one first 2D FFT map;
wherein the processing unit performs the 1D Fast Fourier Transform (FFT) to the second sensing signal for calculating a plurality of second 1D FFT maps, and performs the 2D FFT to the second 1D FFT maps for calculating at least one second 2D FFT map;
wherein the processing unit further picks up one column of the at least one first 2D FFT map and one column of the at least one second 2D FFT map according to a given Doppler index, and performs the 3D FFT to the picked column of the at least one first 2D FFT map and the picked column of the at least one second 2D FFT map for calculating a range Doppler angle.

8. The range Doppler angle detection device as claimed in claim 7, wherein when the processing unit performs the 3D FFT to the picked column of the at least one first 2D FFT map and the picked column of the at least one second 2D FFT map for calculating a range Doppler angle, the processing unit applies the picked column of the at least one first 2D FFT map to be a first column of a transformed map, applies the picked column of the at least one second 2D FFT map to be a second column of the transformed map, paddies 0 to remaining columns of the transformed map, performs the 3D FFT to the transformed map for calculating an angle FFT map, and applies a coordinate rotation digital computer (CORDIC) to the angle FFT map for determining the range Doppler angle.

9. The range Doppler angle detection device as claimed in claim 7, wherein the given Doppler index is 0.

10. The range Doppler angle detection device as claimed in claim 7, wherein the picked column of the at least one first 2D FFT map is a first column of the at least one first 2D FFT map, and the picked column of the at least one second 2D FFT map is a first column of the at least one second 2D FFT map.

11. The range Doppler angle detection device as claimed in claim 7, wherein the first sensing unit is a first receiving chain, and the second sensing unit is a second receiving chain different from the first receiving chain.

12. The range Doppler angle detection device as claimed in claim 7, wherein the transmitting unit is a frequency modulated continuous waveform (FMCW) transmitter;
wherein the first receiving unit and the second receiving unit are FMCW receivers.

13. The range Doppler angle detection device as claimed in claim 7, wherein the processing unit is a central processing unit (CPU) of a smart phone.

* * * * *